United States Patent [19]

Ehritt

[11] 4,381,272
[45] Apr. 26, 1983

[54] METHOD OF AND SYSTEM FOR INJECTING A FLUID INTO A PLASTIFIED MASS IN AN EXTRUDER

[75] Inventor: Jürgen Ehritt, Hilchenbach, Fed. Rep. of Germany

[73] Assignee: Battenfeld Maschinenfabrik GmbH, Meinerzhagen, Fed. Rep. of Germany

[21] Appl. No.: 266,098

[22] Filed: May 21, 1981

[30] Foreign Application Priority Data

May 27, 1980 [DE] Fed. Rep. of Germany ....... 3020122

[51] Int. Cl.³ .............................................. B29D 27/00
[52] U.S. Cl. ................................... 264/40.3; 264/40.5; 264/40.7; 264/50; 264/349; 425/4 C; 425/4 R; 425/146; 425/155; 425/156; 425/817 R
[58] Field of Search ........................ 264/40.3, 50, 40.5, 264/349, 40.7; 425/146, 155, 156, 166, 132, 4 R, 4 C, 817 R

[56] References Cited

U.S. PATENT DOCUMENTS

| | | | |
|---|---|---|---|
| 3,697,204 | 10/1972 | Kyritsis et al. | 425/4 R |
| 3,755,516 | 8/1973 | Bonikowski et al. | 264/40.3 |
| 3,891,362 | 6/1975 | De Vita | 264/50 |
| 3,981,649 | 9/1976 | Shimano et al. | 264/50 |
| 4,043,715 | 8/1977 | Hendry | 264/50 |
| 4,107,354 | 8/1978 | Wilkenloh et al. | 264/50 |
| 4,211,523 | 7/1980 | Hunerberg | 264/50 |

FOREIGN PATENT DOCUMENTS

| | | |
|---|---|---|
| 1909211 | 10/1969 | Fed. Rep. of Germany . |
| 1943930 | 5/1971 | Fed. Rep. of Germany . |
| 1964748 | 12/1973 | Fed. Rep. of Germany . |
| 2422341 | 12/1974 | Fed. Rep. of Germany . |
| 142860 | 7/1980 | Fed. Rep. of Germany ..... 425/4 R |
| 54-123173 | 9/1979 | Japan ................................. 264/40.3 |

*Primary Examiner*—Jeffery R. Thurlow
*Attorney, Agent, or Firm*—Karl F. Ross

[57] ABSTRACT

An extruder system has an extruder provided internally with a worm. A source of an additive fluid under pressure is connected to a conduit opening into the barrel. An upstream valve and a downstream valve are provided in this conduit and a pressurizable fluid reservoir is provided in the conduit between the valves. The extruder is continuously rotated in the barrel to plastify a resin therein. The valves are alternatively opened and closed, that is one is open when the other is closed and vice versa, so that a fluid first flows from the source through the upstream valve into the reservoir and then from the reservoir through the downstream valve into the barrel to be mixed by the worm with the plastic resin therein. The reservoir can be a cylinder having a piston advanced when the downstream valve is opened to force the charge of additive fluid in the reservoir into the barrel.

10 Claims, 3 Drawing Figures

METHOD OF AND SYSTEM FOR INJECTING A FLUID INTO A PLASTIFIED MASS IN AN EXTRUDER

FIELD OF THE INVENTION

The present invention relates to an extruder system wherein a plastified resin is mixed with a fluid, and to a method of operating such a system.

BACKGROUND OF THE INVENTION

It is standard practice in many extruder systems to inject a fluid into the plastified mass right in the extruder barrel. Such a fluid might be a gaseous or liquid foaming agent, a cross-linking agent, or the like. Only such fluids are thus injected which must be under pressure or which react with the normally thermoplastic mass in the barrel so that they have to be added as late as possible in the process.

The system of German published specification No. 1,909,211 controls the dosing of the fluid additive in accordance with the axial displacement of the worm of the extruder. In this manner the ratio of additive fluid to plastic resin is relatively fixed for a good-quality product. The main problem with this system is that the pressure of the plastic mass in the extruder varies considerably. It increases as the worm starts to rotate, then drops substantially, and falls substantially to zero when the worm stops rotating. Furthermore the pressure varies as the worm is axially displaced in systems using an axially displaceable worm. Thus the back pressure effective on the dosed fluid additive varies so that it is often difficult to maintain a fixed ratio between the fluid additive and the plastic resin.

German printed patent application No. 1,964,748 injects the additive fluid between pressure peaks into the extruder, that is between injection operations. Such a system still results in occasional excessive or inadequate dosing of the fluid additive, as the viscosity and pressure variations still lead to a varying back pressure effective against injection of the fluid additive.

OBJECTS OF THE INVENTION

It is therefore an object of the present invention to provide an improved extruder system and method of operating same.

Another object is the provision of such a method which injects an absolute quantity of the fluid additive into the extruder with each operation cycle, regardless of the pressure variations associated with startup of the extruder.

SUMMARY OF THE INVENTION

These objects are obtained with an extruder system having an extruder having a barrel and an extruder worm therein, a source of an additive fluid under pressure, a conduit connected to the source and opening into the barrel, a closable upstream valve in the conduit between the source and the barrel, a closable downstream valve in the conduit between the upstream valve and the barrel, and a pressurizable fluid reservoir in the conduit between the valves. According to this invention the extruder is rotated in the barrel to plastify a resin therein and the valves are alternatively opened and closed—that is, one valve is opened while the other is closed and vice versa—to first admit additive fluid from the source into the reservoir and to thereafter open up the reservoir into the conduit so the fluid can flow from the reservoir into the barrel.

Thus when the extruder is started up the time period during which the pressure builds up in the extruder is used to pressurize or charge the reservoir with an exactly metered quantity of the additive fluid. Subsequently, when the pressure is no longer increasing in the extruder, the charge in the reservoir is injected into the extruder and mixed by the rotating worm with the resin mass. During three different time intervals a dose of the additive fluid is carefully metered out, then injected into the plastic mass, and finally mixed with the plastic mass. The two last operations and time intervals overlap somewhat.

According to further features of this invention the valves are operated by means including an upstream time-delay relay connected to the upstream valve and closable to close same and a similar downstream time-delay relay connected to the downstream valve and closable to close same. The relays have contact means for closing the downstream relay and valve a predetermined time after closing of the upstream relay and vice versa, so that the valves are closed alternatively or only one at a time. The time delays of the relays are adjustable so that the system can easily be programmed for any normally encountered requirements.

In accordance with another feature of this invention pump means is provided in the conduit between the upstream valve and the source for increasing the pressure of the fluid downstream of the pump means. The conduit is provided between the downstream valve and the barrel, normally right at the barrel in fact, with a check valve only permitting fluid flow out of the conduit into the barrel. Such pump means, which in the case of a gaseous additive is a simple compressor, insures that an exact volume at an exact pressure is charged into the reservoir during each cycle. Furthermore the pressure of the additive fluid in the reservoir can be adjusted to be exactly that necessary to overcome the back pressure in the extruder and guarantee the injection of an exactly controlled quantity into the extruder starting at the same time on the pressure curve of each extruder cycle.

This effect is aided, according to yet another feature of this invention, by making the reservoir a chamber having a movable wall, so that displacement of the movable wall varies the volume of the chamber. Normally a cylinder forms the chamber and a piston its movable wall.

An actuator, in accordance with another feature of this invention, is provided for displacing the wall of the reservoir on opening of the downstream valve for forcing the contents of the chamber through the downstream valve into the barrel. Drive means for rotating the worm in the barrel can be connected via appropriate control means to the actuator to displace the wall at a rate proportional to the rotation rate of the worm. This arrangement ensures extreme accuracy in the dosing of the additive fluid into the extruder. Thus the dose in the reservoir is exactly forced under a pressure that can be many times greater than the maximum extruder pressure into the extruder, so that the system can operate almost absolutely volumetrically, that is independentally of pressure in the extruder.

DESCRIPTION OF THE DRAWING

The above and other objects, features, and advantages will become more apparent from the following description and attached drawing in which.

SPECIFIC DESCRIPTION

Figure 1:
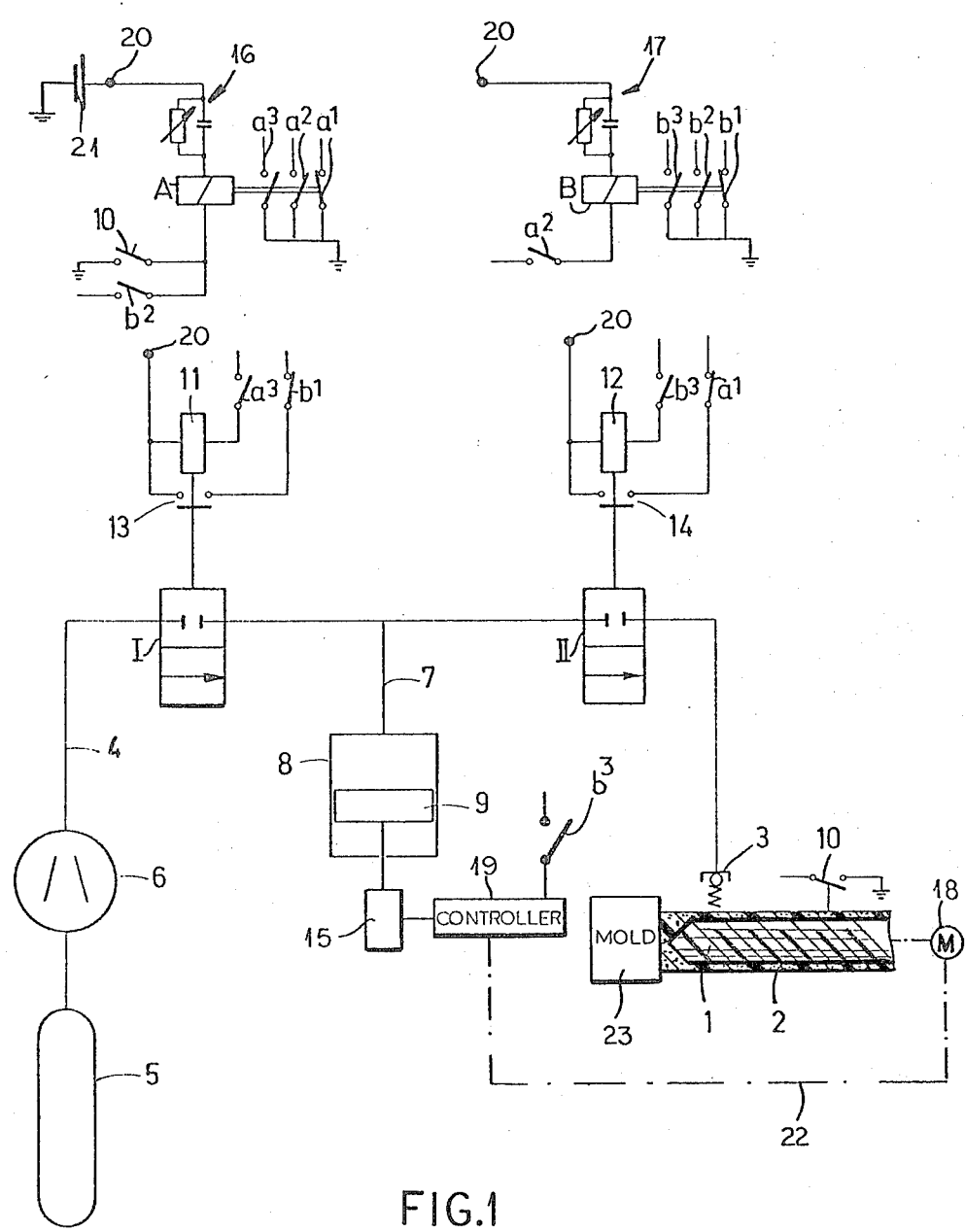
FIG. 1 is a schematic view of the system according to the instant invention with all elements in the rest position.

As seen in FIG. 1 an extruder according to this invention has a screw or ram 1 rotatable by a motor 18 and received in a cylinder or barrel 2. A resin is fed from an unillustrated hopper into the barrel 2, is plastified by the worm 1, and is extruded from the opposite barrel end into a mold 23 as is well known per se. A line or conduit 4 for a fluid additive is connected to the interior of this barrel 2 through a check valve 3 and is connected at its upstream end to a supply 5 of an additive fluid, here compressed gaseous nitrogen. A high-pressure compressor 6 is provided in the line as well as an upstream solenoid valve I and a downstream solenoid valve II. A branch line 7 leads from between the valves I and II in the conduit 4 to a pressurizable reservoir or dosing cylinder 8 having a piston 9 operated by a solenoid 15.

Time-delay relays A and B are connected via respective variable tuned circuits 16 and 17 to the hot side 20 of a source 21 of electricity whose other side is grounded. The valves I and II are spring-loaded into the closed position but can be opened by respective solenoids 11 and 12 having respective holding contacts 13 and 14.

The relay A has a pair of normally closed contacts $a^1$ that are in the holding or latching circuit for the solenoid 12, that is that are in series with the contacts 14, a pair of normally open contacts $a^2$ closable to energize and close the relay B, and another pair of normally open contacts $a^3$ that are closable to energize the solenoid 11.

The relay B has a pair of normally closed contacts $b^1$ that are in the holding or latching circuit for the solenoid 11, that is that are in series with the contacts 13, a pair of normally open contacts $b^2$ closable to energize and close the relay A, and another pair of normally open contacts $b^3$ that are closable to energize the solenoid 12. In addition the contacts $b^3$ are connected through a controller 19 to the solenoid 15 so that, as will be described below, when closed they can move the piston 9 to an extent determined by the rotation rate of the screw 1 as ascertained by a connection 22 between the controller 19 and the motor 18.

The relays A and B are of the type that only closes momentarily a predetermined time t (see Chart), as determined by their respective tuned circuits 16 and 17, after energization. In the drawing some of their pairs of contacts are shown at two separate locations, both at the relay and at the controlled circuit for clarity of illustration; such double illustration is not intended to indicate that any of the contact pairs are duplicated in reality.

A start switch 10 is provided which is normally open and is connected in parallel to the contacts $b^3$. This switch 10 is connected to the worm 1 to close briefly when the worm 1 starts rotating.

Figure 2:
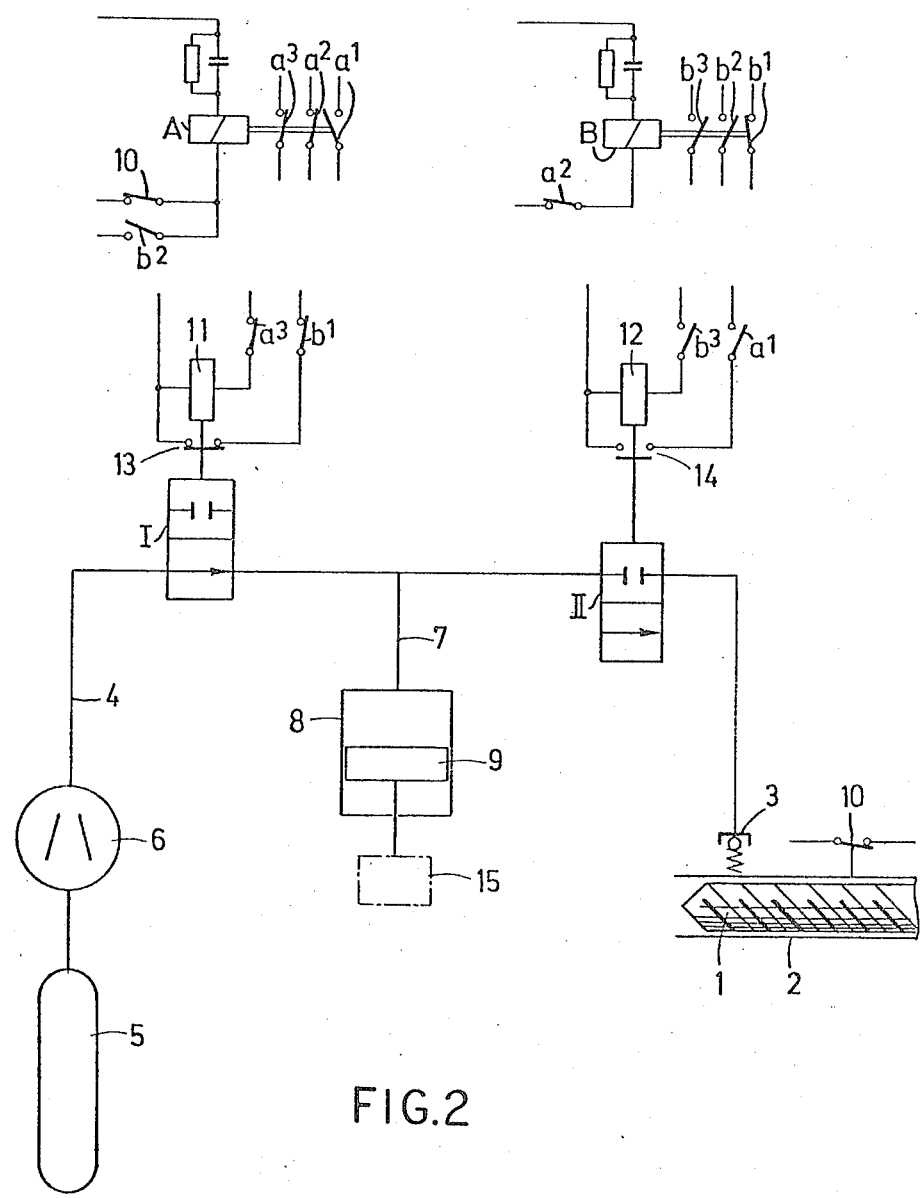
FIGS. 2 and 3 are schematic views similar to FIG. 1 showing the system according to this invention in its two main alternative operative positions.

The system according to the instant invention functions in the following manner, as shown in the below-given Chart:

When the motor 18 starts to rotate the worm 1 the switch 10 closes to start energizing the time-delay relay A. After a short interval t—normally less than 1.0 sec—determined by the setting of the tuned circuit 16, this relay A closes as shown in FIG. 2. At the start of operation opening of the normally closed contacts $a^1$ does nothing. Closing of the contacts $a^2$, however, starts energization of the second time-delay relay B which does not, of course, close immediately. The contacts $a^3$ close the circuit for the solenoid 11.

The solenoid 11 then opens the valve I and closes its latching contacts 13. Since the relay B is not yet energized and its contacts $b^1$ are still closed, this action maintains the energization of the solenoid 11. Compressed gas, whose pressure is augmented considerably by the compressor 6, flows along the conduit 4 through the valve I into the cylinder 8.

Figure 3:
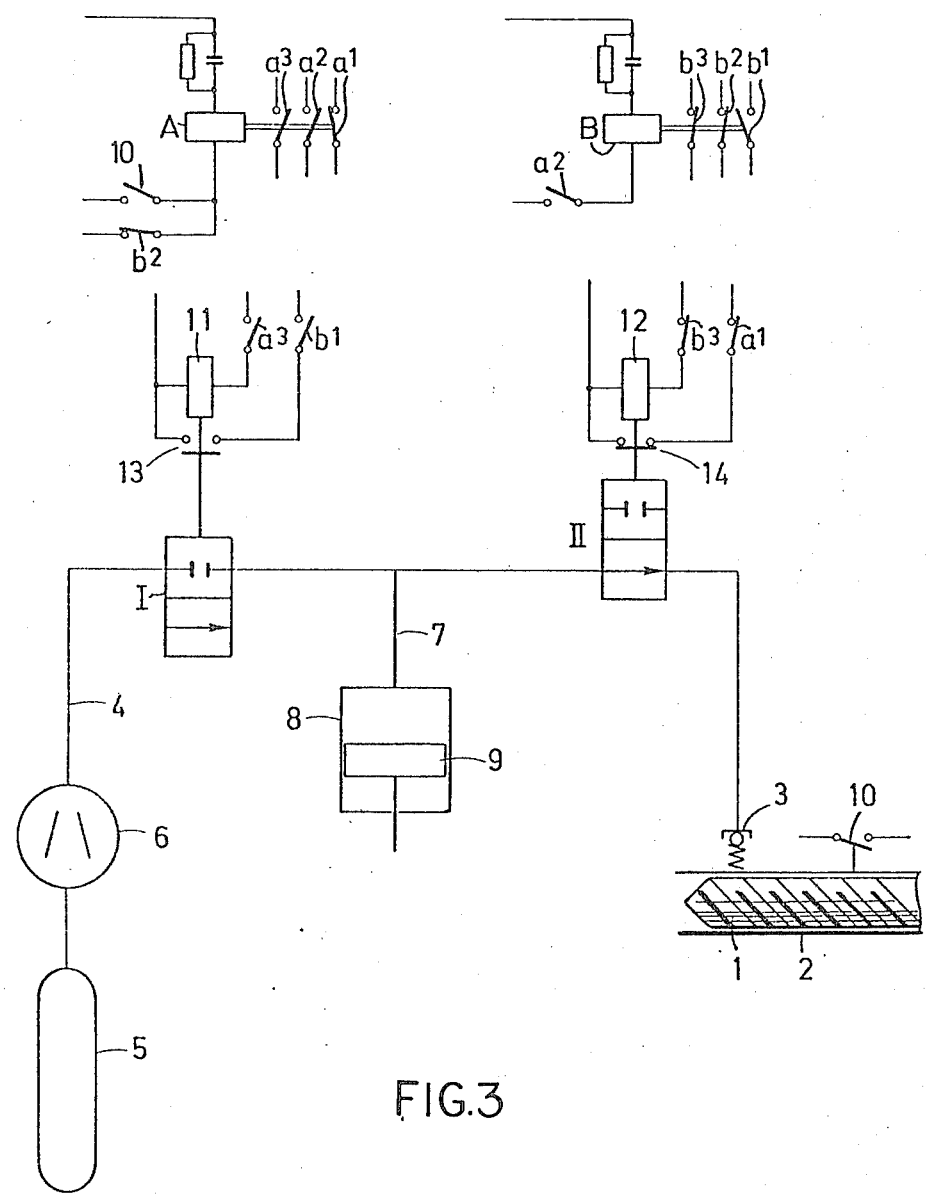

As shown in FIG. 3, when the relay B closes, after a time delay t determined by its tuned circuit 17, it pulls open the contacts $b^1$ to open-circuit the latching circuit for the solenoid 11. This action causes the valve I to close. The contacts $b^2$ simultaneously close to again energize the relay A. The contacts $b^3$ also close to energize the circuit for the solenoid 12.

The valve II is therefore opened and simultaneously closes its latching contacts 14. Since the relay A is at this time not yet energized, the contacts $a^1$ are closed so that the solenoid 12 latches open. The compressed gas in the cylinder 8 then flows through the valve II, conduit 4, and check valve 3 into the barrel 2, providing of course that the gas has a pressure greater than that in the barrel 2. The thus injected gas is mixed by the screw 1 with the plastified resin in the barrel 2.

Meanwhile the tuned circuit 16 for the relay A will energize this relay A and open the contacts $a^1$, thereby unlatching the solenoid 12. From here the contacts $a^2$ and $a^3$ function as above to repeat the cycle.

According to this invention it is possible as illustrated to provide the solenoid 15 for the piston 9, although of course the solenoid 15 could be replaced by a solenoid valve connected between a source of fluid under pressure and a fluid-powered ram or the like, so as to further compress the fluid in the cylinder 8. Thus, when the contacts $b^3$ close, the controller 19 energizes this solenoid 15 to force the fluid in the cylinder 8 under considerable pressure into the barrel 2.

The controller 19 is connected through 22 to the motor 18 so that it pressurizes the fluid in the cylinder 8 to an extent directly proportional to the rotation rate of the worm 1. In this manner it is possible to maintain an exact ratio between the amount of resin being extruded by the worm 1 and the amount of fluid being added to this resin, since the extrusion rate is directly proportional to the worm rotation rate and amount of additive injected is directly proportional to the pressure with which it is injected.

Thus with the system according to the instant invention it is possible to very exactly dose the additive fluid by very simple means. Simply by appropriately adjusting the time constants t of the tuned circuits 16 and 17 it is possible to control the rate of addition of the fluid to extremely close tolerances. Furthermore the circuit employed is extremely simple. The relays A and B could, of course, be replaced by wholly electronic solidstate equivalents, so long as the above-described switching sequence is followed.

The additive according to the illustrated embodiment is gaseous nitrogen. It is also possible to use another gas such as carbon dioxide, in which case it normally would be stored as a liquid and a high-pressure pump would be needed to raise it to the desired pressure once gasified.

CHART

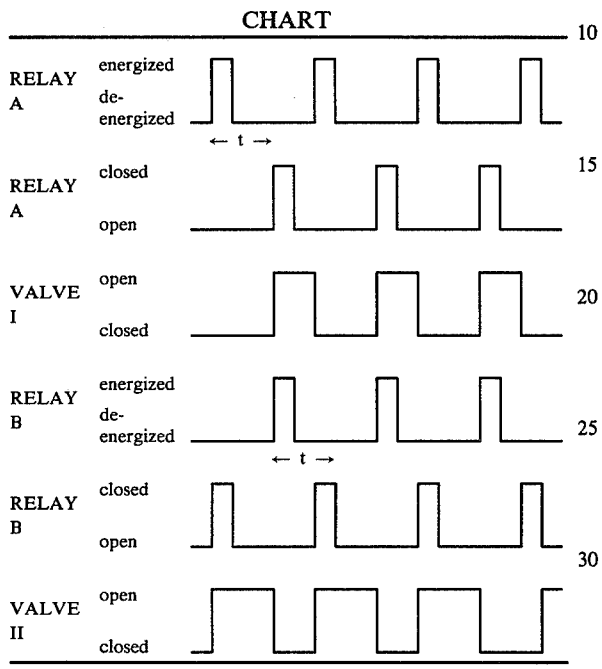

Instead of a gas, it would be just as likely to use the system according to the instant invention to inject another additive fluid, such as a cross-linking agent or other additive which should be added to the resin at the last possible moment.

I claim:

1. A method of operating an extruder system having:
an extruder having a barrel and an extruder worm therein,
a source of an additive fluid under pressure,
a conduit connected to said source and opening into said barrel,
a closable upstream valve in said conduit between said source and said barrel,
a closable downstream valve in said conduit between said upstream valve and said barrel, and
a pressurizable fluid reservoir in said conduit between said valves,
said method comprising the steps of:
rotating said extruder in said barrel to plastify a resin therein;
alternatively opening and closing said valves, whereby when said upstream valve is open and said downstream valve is closed said additive fluid flows into and pressurizes said reservoir and when said upstream valve is closed and said downstream valve is open the pressurized additive fluid in said reservoir flows into said barrel;
detecting the rotation rate of said worm in said barrel; and
pressurizing said reservoir at a level generally proportional to the detected worm rotation rate, whereby as said worm rotates rapidly to greatly pressurize a resin therein said reservoir is pressurized correspondingly with great pressure.

2. An extruder system comprising:
an extruder having a barrel and an extruder worm therein;
a source of an additive fluid under pressure;
a conduit connected to said source and opening into said barrel, whereby said fluid can flow along said conduit from said source to said barrel;
a closable upstream valve in said conduit between said source and said barrel;
a closable downstream valve in said conduit between said upstream valve and said barrel;
a fluid reservoir in said conduit between said valves;
means for alternatively opening and closing said valves, whereby when said upstream valve is open and said downstream valve is closed said additive fluid flows into and pressurizes said reservoir and when said upstream valve is closed and said downstream valve is open the pressurized additive fluid in said reservoir flows into said barrel;
drive means for rotating said worm in said barrel; and
control means connected to said drive means and to said reservoir for pressuring same at a pressure proportional to the rotation rate of said worm.

3. The extruder system defined in claim 2 wherein said means includes an upstream time-delay relay connected to said upstream valve and closable to close same and a downstream time-delay relay connected to said downstream valve and closable to close same.

4. The extruder defined in claim 3 wherein said relays have contact means for closing said downstream relay and valve a predetermined time after closing of said upstream relay and for closing of said upstream relay and valve another predetermined time after closing of said downstream relay.

5. The extruder defined in claim 3 wherein said relays have adjustable time delays.

6. The extruder defined in claim 2, further comprising pump means in said conduit between said upstream valve and said source for increasing the pressure of said fluid downstream of said pump means.

7. The extruder defined in claim 2 wherein said reservoir includes a chamber having a movable wall, whereby the volume of said chamber can be varied by displacing said wall.

8. The extruder defined in claim 7 wherein said reservoir includes actuator means for displacing said wall on opening of said downstream valve for forcing the contents of said chamber through said downstream valve into said barrel.

9. The extruder defined in claim 8 wherein said control means is connected to said drive means and to said actuator means for displacing said wall at a rate proportional to said rotation rate of said worm.

10. The extruder defined in claim 7 wherein said chamber is a cylinder and said wall is a piston therein.

* * * * *